April 19, 1960    S. U. LIEBER    2,933,677
PROBE FOR A THICKNESS TESTING GAGE
Filed Aug. 26, 1955
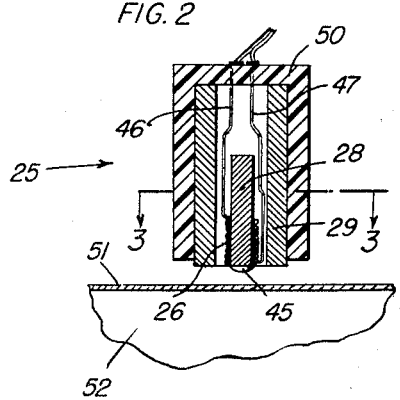
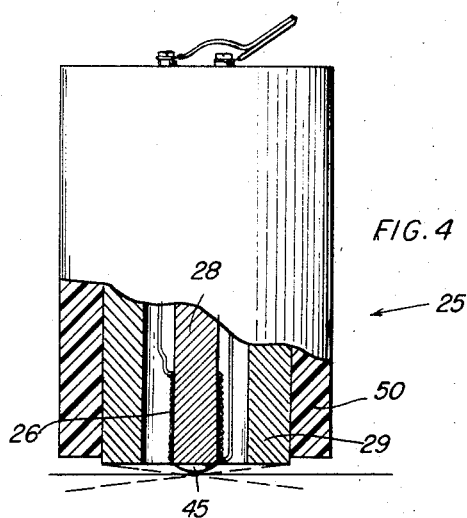
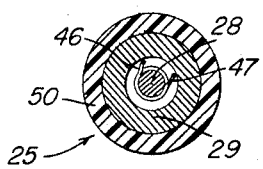
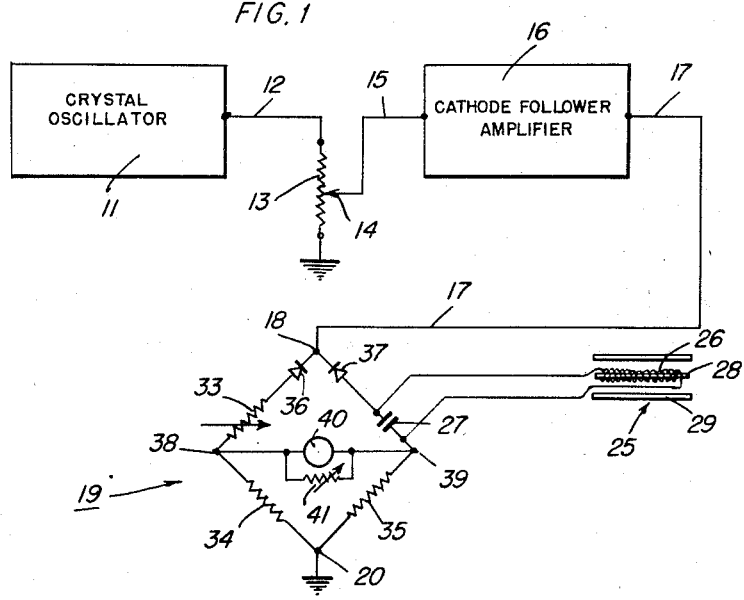
INVENTOR.
Sidney U. Lieber
BY *Robert S. Dunham*
Attorney

# United States Patent Office 2,933,677
Patented Apr. 19, 1960

2,933,677

PROBE FOR A THICKNESS TESTING GAGE

Sidney U. Lieber, Bayside, N.Y., assignor to Unit Process Assemblies, Inc., New York, N.Y., a corporation of New York Application August 26, 1955, Serial No. 530,797

10 Claims. (Cl. 324—34)

This invention is generally concerned with a thickness gage for measuring coating thicknesses. More specifically, the field of application for this invention is that of a high frequency electronic thickness gage which makes use of skin effect in measuring the thickness of a coating of conductive material over another conductive material base. In addition, thickness of other combinations may be measured. For example, thickness of a coating of conductive material over a non-conductive material, thickness of thin conductive sheets or film, thickness of non-conductive coatings on a conductive base material. The invention includes such a thickness-measuring system employing an improved measuring probe.

In the metal plating and coating industry it is desirable to measure the thickness of an outer layer, without destroying the goods in the process of thus measuring such thickness. Prior methods of accomplishing such measurement have been limited to goods where the coating or the base material was ferromagnetic, with the exception of beta-ray or X-ray gages. Thus, a real need has existed for a practical thickness gage to measure the coating of a conductive material over another conductive material base where neither of the materials are ferromagnetic.

The beta-ray or X-ray gages mentioned above can accomplish such measurement, but in each case they are very large and highly expensive. Consequently there has not existed any practical apparatus for making the desired measurements in the ordinary metal plating establishment. However, a skin effect method has been developed by Messrs. Brenner and Garcia-Rivera, which is described in an article published in a periodical entitled "Plating," the November 1953 issue. Even following the development of this skin-effect measuring apparatus, however, there were difficulties rendering the use of such a gage relatively impractical. Such difficulties included a shallow penetration in addition to a large measurement area necessary for accomplishing the required thickness measurement. Thus a relatively flat surface on the material or goods being measured was necessary and in addition, measurements could not be effectuated close to the edges of any given object being measured. Furthermore, it appeared impractical to obtain penetration of more than about six mils (thousandths of an inch).

These latter difficulties which existed in connection with the Brenner Garcia-Rivera system are effectively overcome by means of this invention which includes an improved construction for a probe that may be used with a skin-effect thickness measuring system without the aforesaid difficulties heretofore encountered.

Consequently it is an object of this invention to provide an improved probe for rendering a skin-effect measuring system practical, such that wide use may be made in the plating industry.

Another object of this invention is to provide a thickness gage using radio-frequency signals so as to measure by means of a skin-effect including a probe that renders the measurement area small and eliminates stray-field effects incident to the use of a ferromagnetic core in the probe.

Still another object of this invention is to provide an improved probe that makes use of only a single layer coil, or one having a very limited number of layers, to obtain compact construction and having a low-loss ferromagnetic material core as well as a shield of the same material surrounding the coil so as to avoid deleterious effects of stray fields while at the same time obtaining a highly localized measurement area.

Briefly, the invention includes a probe for use in a thickness testing gage for testing the thickness of an electrically conductive layer over a different conductive material base. Such gage employs a high frequency energization signal and a bridge network including a tuned circuit in one arm of the network. The gage employs a probe comprising a single layered coil, a magnetic material core for said coil, and a magnetic material shield surrounding said coil for eliminating stray-field effects and for concentrating the effective measuring area of said probe.

A probe according to this invention may take various forms within the purview of one skilled in the art, but a particular embodiment thereof is described below, by way of illustration, and is illustrated in the drawings in which:

Fig. 1 is an electrical circuit diagram partially schematic, of a radio frequency thickness measuring apparatus including an improved probe;

Fig. 2 is a longitudinal cross-section view of an embodiment of a probe according to this invention;

Fig. 3 is a lateral cross-section view taken along the line 3—3 of Fig. 2; and

Fig. 4 is an enlarged elevation, partly broken away in cross-section, illustrating the action of the rounded-tip construction of the core.

A measuring system according to this invention makes use of an electrical circuit such as that illustrated in Fig. 1, which includes an oscillator 11 that is marked "crystal oscillator" and may be any feasible type of radio frequency oscillator, desirable. The particular oscillator circuit employed forms no part of this invention per se, but it is preferred to employ a crystal oscillator for maintaining the frequency constant in a relatively simple, inexpensive manner.

The output of the oscillator 11 is fed via a wire 12 to a potentiometer resistance 13 which has a sliding contactor 14 in connection therewith. The signals may thus be attenuated at a relatively low power level, and will be fed over a wire 15 to the input of a cathode follower type of amplifier 16. Other types of amplifiers than a cathode follower might be employed if desired, since the details of the amplifier circuit form no part per se of this invention.

The radio frequency signals, after amplification in the amplifier 16, are fed via a wire 17 to an input point 18 of a resistance bridge network 19. The energization circuit for bridge network 19 is completed via another bridge input point 20 that is connected directly to ground as illustrated. Bridge network 19 includes in one arm thereof an improved probe element 25 which has a coil 26 that is electrically tuned for resonance with a condenser 27. Such tuning for resonance is done in the usual manner for obtaining good stability, i.e. the condenser 27 is adjusted in capacitance value so that the tuned circuit is a discrete amount below resonance (off peak). Probe element 25 also includes a low-loss ferromagnetic material core 28, and a surrounding electrically floating shield 29 of the same material as the core 28. The details of this probe element will be set forth fully below in connection with the other figures of the drawings.

It is pointed out that in the case of the measurements of the thickness of a non-conductive coating on a conductive material base, the tuning of the coil 26 and the condenser 27 will be a special case in that the amount of capacitance will be set for considerable detuning down the side of the resonance curve. This gives the best sensitivity for this type of measurements.

It may be noted here that it is contemplated that the shield 29 need not be electrically floating. Consequently the shield 29 and the core 28 may be constructed integrally of a single piece of material. Furthermore, it will be clear that the coil 26 need not be wound directly on the core 28, but might be wound on a coil form (not shown) of any suitable material so as to be located any radial distance from the centerline of the core 28 within the space between the shield 29 and the core 28.

Bridge network 19 includes, in the other three arms thereof, a variable resistor 33 and a pair of fixed resistors 34 and 35. In addition, there are two rectifiers 36 and 37 which may take various forms, such as vacuum tube diodes, germanium or selenium-type rectifiers or the like.

Connected across a pair of output points 38 and 39 of the bridge network 19, there is a measuring instrument 40 that has a variable resistor 41 connected in shunt therewith. The instrument 40 may be any feasible D.C. voltmeter having the required sensitivity for indicating the degree of balance of the bridge as well as the zero output of the balanced condition thereof.

In effecting measurements of the thickness of a conductive material layer over a different conductive material base, the procedure is a simple one that merely involves a prior calibration, such that the bridge network 19 is balanced when the probe element 25 is in contact with a sample of the base material that is to be measured. Then, by calibrating the degree of unbalance of the bridge network 19 for given coating materials, the instrument 40 may be made to record directly in terms of the thickness of the coating being measured, when the probe element 25 is placed in contact with the surface of the goods, or other coated material to be measured. It is to be noted that in practice, a measuring instrument according to this invention will employ a plurality of different-frequency energization signals to the bridge network 19. In addition, it may make use of different probe elements 25 for employing coils 26 having different electrical reactance characteristics to match the particular frequency that is to be employed. In this manner, various ranges of thicknesses of the coating being measured may be had, while maintaining satisfactory accuracy in the measurements.

The details of the construction of a probe element 25 may of course vary in its physical appearance. However, one type of probe is illustrated in Figs. 2–4.

Referring to Fig. 2, it will be noted that the construction is quite simple and includes the core element 28 in the form of a thin cylinder or rod which has a tip portion 45 at the outer extremity thereof. The coil 26 is a single layer coil having a predetermined number of turns to provide the desired electrical reactance in accordance with the frequency range for a given probe. The ends of the coil 26 are carried to the lead wires by a pair of internal conductors 46 and 47. There is a plastic or other convenient insulating material housing 50, which surrounds the shield member 29 and encloses the entire probe 25 to provide a unitary element thereof. As illustrated in Fig. 2, the probe element 25 is employed for measuring the thickness of a plating or other coating layer, e.g. layer 51 over a base metal 52.

Fig. 4 illustrates the manner in which the tip portion 45 of the core 28 acts to provide accurate measurements irrespective of the angle that the probe element 25 is maintained relative to the perpendicular with respect to the surface of the material being measured, within predetermined limits.

It will be noted that tip 45 is rounded and extends beyond the extremities of both the housing 50 and the shield 29, while the lower surface or face of these two elements are stepped back as illustrated. This construction allows a limited amount of tipping of the entire probe 25 to take place, while still maintaining contact with the core 28 by means of its tip 45 on the surface of the material to be measured.

It will be noted that by using a magnetic material core 28 (having sufficient low loss characteristics for the frequencies employed), the effective field produced by the coil 26 will be transmitted to the material being measured via the tip 45, irrespective of the number of turns employed. Thus a coil having a high inductive reactance may be employed, and consequently lower frequencies may be employed without rendering the size and effective measuring area of the probe prohibitive.

In order to obtain maximum sensitivity, the coil 26 should be wound with the lowest turn (when viewed as shown in Figs. 2 and 4) as near the tip of the core 28 as possible.

In addition, it is pointed out that the use of a shield, e.g. shield 29, renders the effective area quite concentrated. Therefore, accurate measurements may be made on parts with curved surfaces having relatively short radius of curvature. Similarly, measurements may be made right up to the edge of any given piece or article. This is particularly true since the single layer coil 26 may be wound on a relatively thin core 28 so that the area of flux distribution is quite small and concentrated.

It is pointed out that the condenser 27 and coil 26 together form a tuned circuit so that the total impedance of both in the bridge network 19 is substantially an in-phase impedance like the resistors 33, 34 and 35 which form the other three legs of the bridge.

In operating the apparatus the instrument will be adjusted for proper readings at the end points of the measurements in the following manner: First the probe 25 will be applied to a sample of the pure base metal and the bridge 19 balanced to create a zero reading on instrument 40, by adjusting variable resistor 33. Then the upper limit will be set by applying the probe 25 to a sample of pure coating material, and adjusting the instrument 40 to its maximum calibrated reading for the given thickness of such coating by adjusting the variable shunt resistor 41. Then, the apparatus is ready to measure any desired articles coated with that material over that base metal within that range of thickness, the instrument 40 being calibrated to read in mils thickness of the coating.

While a specific embodiment of the invention has been described in some detail in accordance with the applicable statues, this is not to be taken as in any way limiting the invention, but merely as being descriptive thereof.

It is claimed:

1. In a thickness testing gage for testing the thickness of an electrically conductive non-magnetic layer over a different conductivity non-magnetic material base and employing a radio frequency energization signal and a bridge network including a tuned circuit in one arm thereof, a probe comprising a substantially single layered coil, a low-loss magnetic material core for said coil, and a shield of the same magnetic material as said core, said shield surrounding said core for eliminating stray field effects and for concentrating the effective measuring area of said probe.

2. In a thickness testing gage for testing the thickness of an electrically non-magnetic layer over a different conductivity non-magnetic material base and employing a radio frequency energization signal and a bridge network including a tuned circuit in one arm thereof, a probe comprising a single layered coil, a low-loss ferromagnetic material core for said coil, and an electrically floating shield of the same material as said core, said shield surrounding said core for eliminating stray field effects and for concentrating the effective measuring area of said probe, the coil of said probe being an element of said tuned circuit.

3. In a thickness testing gage for testing the thickness of an electrically conductive non-magnetic layer over a different conductivity non-magnetic material base and employing a radio frequency energization signal and a bridge network including a tuned circuit in one arm thereof, a probe comprising a single layered coil, a low-loss ferromagnetic material core for said coil, a tip on said core for contacting the surface layer to be measured, an electrically floating shield of the same material as said core, said shield surrounding said core for eliminating stray field effects and for concentrating the effective measuring area of said probe, and a housing for supporting the shield relative to the coil and core, said tip having a rounded surface extending beyond the shield and the housing so as to allow some rocking of the probe while maintaining contact with the surface being measured.

4. In a thickness testing gage for testing the thickness of an electrically conductive non-magnetic layer over a different conductivity non-magnetic material base and employing a radio frequency energization signal to energize a bridge network having three resistance arms and a tuned circuit as the fourth arm thereof, said bridge including a pair of rectifiers for rendering the output D.C. and means for measuring the degree of unbalance of the bridge for indicating the thickness of the said layer, a probe comprising a single layered coil, a low-loss ferromagnetic material core for said coil, a tip on said core for contacting the surface layer to be measured, an electrically floating shield of the same material as said core, said shield surrounding said core for eliminating stray field effects and for concentrating the effective measuring area of said probe, and a housing for supporting the shield relative to the coil and core, said tip having a rounded surface extending beyond the shield and the housing so as to allow some rocking of the probe while maintaining contact with the surface being measured.

5. A thickness testing gage for use in the metal plating field for measuring the thickness of a layer of non-magnetic conductive material over a non-magnetic conductive material base including a radio frequency energization signal to energize a bridge network having three resistance arms and a tuned circuit as the fourth arm thereof, said bridge including a pair of rectifiers for rendering the output D.C. and means for measuring the degree of unbalance of the bridge for indicating the thickness of the said layer, said tuned circuit including a probe comprising a single layered coil, a low-loss ferromagnetic material core for said coil, a tip on said core for contacting the surface layer to be measured, an electrically floating shield of the same material as said core, said shield surrounding said core for eliminating stray field effects and for concentrating the effective measuring area of said probe, and a housing for supporting the shield relative to the coil and core, said tip having a rounded surface extending beyond the shield and the housing so as to allow some rocking of the probe while maintaining contact with the surface being measured.

6. An improved probe for use in a radio frequency electronic thickness gage comprising a single layered coil, a low-loss ferromagnetic material core for said coil, and an electrically floating shield of the same material as said core, said shield surrounding said core for eliminating stray field effects and for concentrating the effective measuring area of said probe.

7. An improved probe for use in a radio frequency electronic thickness gage comprising a single layered coil, a low-loss ferromagnetic material core for said coil, a tip on said core for contacting the surface layer to be measured, and an electrically floating shield of the same material as said core, said shield surrounding said core for eliminating stray field effects and for concentrating the effective measuring area of said probe.

8. In a thickness testing gage for testing the thickness of an electrically conductive non-magnetic layer over a different conductivity non-magnetic material base and employing a radio frequency energization signal and a bridge network including a tuned circuit in one arm thereof, a probe comprising a single layered coil, a low-loss magnetic material core for said coil, and a shield of the same magnetic material as said core, said shield surrounding said core for eliminating stray field effects and for concentrating the effective measuring area of said probe, and a housing for supporting the shield relative to the coil and core, said tip having a rounded surface extending beyond the shield and the housing so as to allow some rocking of the probe while maintaining contact with the surface being measured.

9. An improved probe for use in a radio frequency electronic thickness gage comprising a single layered coil, a low-loss ferromagnetic material core for said coil, a tip on said core for contacting the surface layer to be measured, and an electrically floating shield of the same material as said core, said shield surrounding said core for eliminating stray field effects and for concentrating the effective measuring area of said probe, said tip extending below the extremity of said shield to allow limited rocking of the probe when in measuring contact with the surface being measured.

10. An improved probe for use in a radio frequency electronic thickness gage comprising a single layered coil, a low-loss ferromagnetic material core for said coil, a tip on said core for contacting the surface layer to be measured, and an electrically floating shield of the same material as said core, said shield surrounding said core for eliminating stray field effects and for concentrating the effective measuring area of said probe, and a housing surrounding said shield for supporting the shield relative to said coil and core, said tip being rounded and extending below the extremity of said shield to allow limited rocking of the probe when in measuring contact with the surface being measured, said housing being stepped back from the extremity of said shield to provide clearance of the housing to allow the said rocking of the probe about said rounded tip.

References Cited in the file of this patent

UNITED STATES PATENTS

| 2,320,761 | Tait et al. | June 1, 1943 |
| 2,435,985 | Stewart et al. | Feb. 17, 1948 |
| 2,481,345 | Reynst | Sept. 6, 1949 |
| 2,572,908 | Bfenholdt | Oct. 30, 1951 |
| 2,660,704 | Harmon et al. | Nov. 24, 1953 |
| 2,751,552 | Brenner | June 19, 1956 |
| 2,797,386 | Callan | June 25, 1957 |
| 2,809,346 | Archer | Oct. 8, 1957 |

FOREIGN PATENTS

| 144,039 | Australia | Nov. 1, 1951 |

UNITED STATES PATENT OFFICE

CERTIFICATE OF CORRECTION

Patent No. 2,933,677                                                April 19, 1960

Sidney U. Lieber

It is hereby certified that error appears in the printed specification of the above numbered patent requiring correction and that the said Letters Patent should read as corrected below.

Column 4, line 68, after "electrically" insert -- conductive --.

Signed and sealed this 22nd day of November 1960.

(SEAL)
Attest:

KARL H. AXLINE
Attesting Officer

ROBERT C. WATSON
Commissioner of Patents